US009245200B2

(12) United States Patent
Magri et al.

(10) Patent No.: US 9,245,200 B2
(45) Date of Patent: Jan. 26, 2016

(54) METHOD FOR DETECTING A STRAIGHT LINE IN A DIGITAL IMAGE

(71) Applicants: STMICROELECTRONICS S.R.L., Agrate Brianza (IT); STMICROELECTRONICS INTERNATIONAL N.V., Amsterdam (NL)

(72) Inventors: Luca Magri, Milan (IT); Beatrice Rossi, Milan (IT); Subarna Tripathi, Bangalore (IN); Pasqualina Fragneto, Burago di Molgora (IT); Emiliano Mario Piccinelli, Cavenago Brianza (IT)

(73) Assignees: STMicroelectronics S.r.l., Agrate Brianza (IT); STMicroelectronics International N.V., Amsterdam (NL)

( * ) Notice: Subject to any disclaimer, the term of this patent is extended or adjusted under 35 U.S.C. 154(b) by 0 days.

(21) Appl. No.: 14/068,437

(22) Filed: Oct. 31, 2013

(65) Prior Publication Data

US 2014/0161359 A1      Jun. 12, 2014

(30) Foreign Application Priority Data

Nov. 9, 2012   (IT) ................. VI2012A0303

(51) Int. Cl.
  *G06K 9/46*   (2006.01)
  *G06T 7/00*   (2006.01)
(52) U.S. Cl.
  CPC ............ *G06K 9/4604* (2013.01); *G06T 7/0085* (2013.01); *G06T 2207/20061* (2013.01)
(58) Field of Classification Search
  CPC ............... G06K 9/4604; G06T 7/0085; G06T 2207/20061

USPC .................. 382/199, 281, 203, 104, 200, 201
See application file for complete search history.

(56) References Cited

U.S. PATENT DOCUMENTS 6,111,993 A  *  8/2000  Matsunaga ................... 382/281
6,373,918 B1 *  4/2002  Wiemker .............. G06T 7/0012
                                                        378/4

(Continued)

FOREIGN PATENT DOCUMENTS

EP           1498847          1/2005

OTHER PUBLICATIONS

Rafael Grompone von Gioi et al., "On Straight Line Segment Detection", J Math Imaging, Springer Science+Business Media, LLC published 2008, pp. 35.*

(Continued)

*Primary Examiner* — Mekonen Bekele
(74) *Attorney, Agent, or Firm* — Seed IP Law Group PLLC (57) ABSTRACT

An embodiment is a computer-implemented method for detecting a straight line in a digital image comprising a plurality of pixels comprising the steps: detecting an edge in the digital image, generating a first straight line which passes through a first pixel of the detected edge, generating a second straight line which passes through a second pixel of the detected edge, which is different from the first pixel, determining at least two intersections with a boundary of the digital image for each generated straight line, determining a set of two parameter values for each generated straight line based on the respective determined at least two intersections, wherein the set of two parameter values uniquely determines the respective generated straight line, and detecting the straight line in the digital image based on the determined sets of two parameter values.

23 Claims, 2 Drawing Sheets

(56) References Cited

U.S. PATENT DOCUMENTS

| | | | | |
|---|---|---|---|---|
| 6,778,699 | B1* | 8/2004 | Gallagher | 382/165 |
| 7,221,789 | B2* | 5/2007 | Honda | 382/154 |
| 8,254,667 | B2* | 8/2012 | Kim et al. | 382/154 |
| 8,396,299 | B2* | 3/2013 | Sakurai | 382/201 |
| 8,805,056 | B2* | 8/2014 | Bala et al. | 382/154 |
| 2002/0061123 | A1* | 5/2002 | Akutagawa | 382/104 |
| 2002/0063893 | A1* | 5/2002 | Fujieda | G06T 7/0004 358/1.15 |
| 2007/0183667 | A1* | 8/2007 | Wyatt | G06K 9/4609 382/201 |
| 2008/0208547 | A1* | 8/2008 | Kim | G06T 7/0061 703/2 |
| 2010/0085440 | A1* | 4/2010 | Fujita et al. | 348/222.1 |
| 2011/0033118 | A1* | 2/2011 | Yildiz et al. | 382/199 |
| 2011/0150279 | A1* | 6/2011 | Kotake | G06T 7/0065 382/103 |

OTHER PUBLICATIONS

Anand et al., , "Detection of Straight Lines Using Rule Directed Pixel Comparison (RDPC) Method", published on 2011, in proceedings of the 2011 international conference.pp. 11.*

Anne Solberg, INF 4300-Hough Transform, published on Sep. 21, 2009, pp. 20, http://www.uio.no/studier/emner/matnat/ifi/INF4300/h09/undervisningsmateriale/hough09.pdf.*

Anand et al.,, "Detection of Straight Lines Using Rule Directed Pixel Comparison (RDPC) Method", published on 2011, in proceedings of the 2011 international conference.pp. 11.*

Anne Solberg, INF 4300-Hough Transform, published on Sep. 21, 2009, pp. 20, http://www.uio.no/studier/emner/matnat/ifi/NF4300/h09/undervisningsmateriale/hough09.pd.*

Search Report for Italian patent application No. VI20120303; Munich, Germany; Jul. 17, 2013, 2 pages.

Gian Luca Foresti, "A Real-Time Hough-Based Method for Segment Detection in Complex Multisensor Images", Real-Time Imaging, Academic Press Limited, Great Brittain, vol. 6, No. 2, Apr. 1, 2000; pp. 93-111.

Richard O. Duda, and Peter E. Hart, "Use of the Hough Transformation to Detect Lines and Curves in Pictures", Communications of the ACM, Association for Computing Machinery, Inc, United States, vol. 5, No. 1, Jan. 1, 1972; pp. 11-15.

* cited by examiner

(a) Resolution: 1280 x 720          (b) VP=(1761, 772) outside image, right case (c) Resolution: 1280 x 720          (d) VP=(798, 338) inside image, in case (e) Resolution: 1280 x 720          (f) VP=(-480, 636) outside image, left case

*FIG. 4*

METHOD FOR DETECTING A STRAIGHT LINE IN A DIGITAL IMAGE

PRIORITY CLAIM

The instant application claims priority to Italian Patent Application No. VI2012A000303, filed 9 Nov. 2012, which application is incorporated herein by reference in its entirety.

TECHNICAL FIELD

An embodiment relates to a method for detecting a straight line in a digital image using a modified Hough transform between a parameter space and a quantized accumulation space, allowing for subsequent determination of vanishing lines and vanishing points in the digital image.

SUMMARY

Finding straight lines in digital images is a problem that occurs in many computer-vision applications. Here and in the following, a straight line generally means an infinite straight line. Knowledge about the straight lines in an image represents very important information, for example, in vanishing-points estimation, which is part of the more general problem of estimating a depth map. In this context, finding straight lines represents the first stage of the problem. Once straight lines are detected, their intersections can be determined and vanishing points can be calculated as those intersection points whose immediate surrounding area has a significant number of detected straight lines passing through it. It is well known that the efficiency of this method of detecting vanishing points strongly relies on the accuracy of the line-detection step. Most of the existing methods to detect straight lines in digital images build on the use of a Hough transform, a well-known global technique for detecting parametrical objects, such as lines or circles.

The Hough transform is a general technique for identifying the locations and orientations of certain types of objects in a digital image. The classical Hough transform was concerned with the identification of straight lines in an image, but since then the Hough transform has been extended to identify positions of objects of arbitrary shape. The Hough transform, as it is universally used today, was invented by Richard Duda and Peter Hart in 1972, who named it "generalized Hough transform" after the related 1962 patent of Paul Hough. The main idea is to consider the characteristics of a straight line in terms of its parameters. Based on this idea, a straight line can be represented as a point in an appropriate parameter space. The Hough transform then works as follows:

detect an edge in a digital image
  for every pixel of the edge, generate at least one straight line passing through it
  the parameters of each of the at least one straight line vote for the corresponding straight line passing through the pixel; that is, the parameters represent or identify the corresponding straight line, and from these parameters a computing circuit can determine a straight or curved line that at least approximates the detected edge.
  votes are accumulated in the parameter space of straight lines.

Many methods employing a Hough transform have a structure similar to the one presented, but they differ in the parameter space in which the votes are accumulated.

The term edge here and in the following does not refer to the physical boundary of the image, but rather to an edge-like feature with respect to the context of the image. Such an edge feature may, for instance, be given by points or sets of points in the digital image, at which the image brightness and/or color changes abruptly or has a discontinuity. Such abrupt changes may be caused by discontinuities in depth, such as, for instance, by the corner of a house, by discontinuities in surface orientation, such as, for instance, the sides of a cube, by changes in material properties like material color, density, reflectance, absorption or surface smoothness, by variations in scene illumination, like, for instance, shadows cast by objects, and so on. Edges in this meaning may, in particular, be curvilinear, such as, for instance, the edge of a round table, or the silhouette of a human body. They may further be represented by actual lines, i.e., of vanishing thickness, or may have a certain thickness. Also an edge need not necessarily be continuous, but may consist of various separated segments.

The first step of a Hough transform, the edge detection in a digital image, is a fundamental process in image processing, machine vision, and computer vision. Many edge detection methods are known in the art, wherein most of them can be grouped into two categories, search-based and zero-crossing-based. The search-based methods detect edges by first computing a measure of edge strength, usually a first-order derivative expression such as the gradient magnitude, and then searching for local-directional maxima of the gradient magnitude using a computer estimate of the local orientation of the edge, which is usually the gradient direction. The zero-crossing-based methods search for zero-crossings in a second-order derivative expression computed from the image in order to find edges, usually the zero-crossings of the Laplacian or the zero-crossings of a non-linear differential expression. As a pre-processing step to edge detection, a smoothing stage, typically Gaussian smoothing, is almost always applied.

As part of the edge-detection process, a measure of edge strength may be computed and compared to a predetermined threshold in order to decide whether or not an edge is present at an image point. If the edge detection step is successful, a set of pixels of the digital image constituting the detected edge is determined. Once edges have been detected in a digital image, a subsequent interpretation of the information contents of the original image, like, for instance, vanishing-point detection, may be substantially simplified.

Edges extracted from non-trivial images are often affected by fragmentation, meaning that the edge curves are not connected, edge segments are missing, as well as false edges not corresponding to interesting phenomena are detected in the image—thus complicating the subsequent task of interpreting the image data.

Due to ubiquitous noise and speckles in digital images, detecting an edge is a non-trivial task. For the detection of a specific sub-class of edges, e.g., straight lines and ellipses, many current-day edge-detection methods employ Hough transforms according to the state of the art. When using Hough transforms to detect straight lines and ellipses, so-called edge thinning can significantly improve the results. Here and in the following, edge thinning is a technique used to remove unwanted spurious points of a detected edge in an image.

A Hough transform generally includes two projections. The first projection maps a set of straight lines onto a two dimensional parameter space Par, while the second projection carries out a quantization of the parameter space according to a quantization map. The resulting space is generally called accumulation space. In a complete Hough transform, at least one straight line passing through a pixel is generated for every detected edge pixel. Since any straight line can be parameterized by an appropriate selection of exactly two parameters, the first projection maps the corresponding line onto the parameter space through its corresponding parameters. By quantizing, i.e., discretizing, the parameter space according to a predetermined quantization map, the sets of two parameter values representing the generated straight lines, which are also called votes, are accumulated in the so called accumulation space.

Depending on the type of parameters, which are selected to represent a straight line, two different types of accumulation spaces are known in the art.

The so-called slope-intercept accumulation space is built based on the representation of a line by the linear equation y=mx+q, where m is the slope of a straight line, and q is the y-axis intercept of the line. Using this form, a line is associated with a point (m,q) in the parameter space Par. However, several problems arise when trying to quantize this parameter space since both the slope m and the intersection q are generally unbounded parameters and can, therefore, not be uniformly quantized for an arbitrary set of lines intersecting the digital image. For this reason, the slope-intercept accumulation space is generally unbalanced.

Therefore, a polar representation of straight lines has been used as an alternative for the accumulation space in the art. For an arbitrary point on the image plane with coordinates, e.g., $(x_0, y_0)$, the straight lines that go through it can be represented by the pairs $(r, \ominus)$ with:

$$r(\ominus)=x_0 \cdot \cos \ominus + y_0 \cdot \sin \ominus, \qquad \text{Equation 1:}$$

where r denotes the distance between the straight line and the origin of the two dimensional Cartesian coordinate system and the angle $\ominus$ is given by the angle of the vector from the origin to the closest point of the straight line with the x-axis. Thus, for each point on the image plane, the pencil of straight lines passing through it corresponds to a sinusoidal curve in the $(r, \ominus)$ plane, which is unique to that point. If the curves corresponding to two points are superimposed, the location in the accumulation space, where they cross, corresponds to a straight line in the original image space that passes through both points. More generally, a set of points that form a straight line will produce sinusoids which cross at the parameters for that straight line. Thus, the problem of detecting collinear points in an image can be converted to the problem of finding concurrent curves in the accumulation space.

In practice, a, potentially large, number of pairs $(r, \ominus)$ is calculated for each detected edge point according to equation 1 by stepping through discrete values of the angle $\ominus$ from 0 to $2\pi$ using predetermined steps. Since the calculation of each $(r, \ominus)$-pair according to equation 1 involves the evaluation of at least two trigonometric functions, and since a typical edge detection in a digital image yields a substantial number of edge points, i.e., pixels, accumulating a sufficient number of votes, i.e, pairs $(r, \ominus)$, for a successful detection of a straight line in a digital image using a polar accumulation space is computationally highly expensive.

Since image-processing algorithms based on edge detection and straight-line detection in a digital image are nowadays implemented to an ever higher degree even in devices with rather limited computational and memory resources, like, for instance, camera-equipped mobile phones, smart phones, digital cameras, and digital video cameras, an improved and highly effective method of detecting and representing a straight line in a digital image is needed in order to enable real-time processing or fast post processing on such devices. In particular, computation of a depth map for a digital image relying on the detection of one or multiple vanishing points typically requires the detection of a generally large set of straight lines in a digital image. Filtering operations, based on a depth map, like, for instance, a selective blur of an image to varying degrees, can, therefore, be realized on such devices with limited computing resources only if a highly effective algorithm for the detection of straight lines can be devised.

The technical problem described above may be solved by a computer-implemented embodiment for detecting a straight line in a digital image including a plurality of pixels, the embodiment including the consecutively performed steps in the recited order:

detecting an edge in the digital image;
generating a first straight line which passes through a first pixel of the detected edge;
generating a second straight line which passes through a second pixel of the detected edge, which is different from the first pixel;
determining at least two intersections with a boundary of the digital image for each generated straight line;
determining a set of two parameter values for each generated straight line based on the respective determined at least two intersections, wherein the set of two parameter values uniquely determines the respective generated straight line and;
detecting the straight line in the digital image based on the determined sets of two parameter values.

The digital image is, in particular, a so-called raster image, which includes a finite set of digital values, called picture elements or pixels. An embodiment may also be applied to vector images after converting the vector image to a raster image according to conventional methods. The digital image may be taken by an image-capturing device, such as, for instance, a digital camera, a camera-equipped cell phone or smart phone, a digital video camera, or any other digital image-capturing device. The digital image may also be stored on an internal or external memory of the image-capturing device in any conventional image format, including GIF, JPEG, and PNG, and may be read from such a memory into a processing unit, in which an embodiment, such as the above-described embodiment, is implemented. The digital image may also result from digitizing an analog image or from artificially creating a digital image, e.g., based on ray tracing and/or rendering techniques. Each pixel includes one or several color values and/or a luminance value and/or an alpha channel, wherein the pixel values may be coded according to any conventional method such as, e.g., the RGB color format, the RGBA color format, the YUV color format, or the CMYK color format.

The step of detecting an edge in the digital image may be carried out according to any conventional edge-detection methods, such as according to a search-based or to zero-crossing-based method. The edge may be detected as a sharp change in any of the channels of the digital image, wherein any of the above-described particular methods may be employed. In particular, the edge may be detected as a sharp change in an image function, i.e., a function of one or several channels of the digital image, e.g., the image intensity. For being able to detect a straight line, the detected edge generally includes at least two pixels. The at least two pixels may be located in separated segments of the detected edge or even in different detected edges. Here, the term detected edge is not limited to a continuous edge or segments of an edge that logically (with respect to the image content) belong together. It rather denotes an arbitrary set of image pixels which have been determined by an edge detection step to be edge pixels. Generally, this means that the absolute value of a local gradient of an image function, e.g., the image intensity, at the location of the image pixel is greater than a predetermined threshold, and/or a function involving a second derivative of the image function, like, for instance, the Laplacian, has a zero crossing at the image pixel. The detected edge within the context of this application may further be a set of pixels from various detected edges. Furthermore, the detected edge may have an arbitrary thickness in number of pixels, which may also vary along the edge. The detected edge may further include a large number of pixels. In that case, a selection of a subset of the corresponding pixels may be carried out before continuing with the detection of a straight line. The selection of a subset may be carried out according to a predetermined condition, for instance a minimum distance between any two pixels of the subset.

A first straight line which passes through a first pixel of the detected edge is then generated, wherein passing through a pixel may be defined as passing through a specific mathematical point of the pixel, e.g., the center of the pixel, or simply by passing through the area covered by the pixel. The first straight line may be a straight line in the mathematical sense, i.e., with zero thickness, or may have a predetermined thickness, e.g., the width, the height, or diagonal of a pixel.

In step c) of the computer-implemented method, a second straight line which passes through a second pixel of the detected edge, which is different from the first pixel, is generated. The second generated straight line may be different from the first generated straight line; however, particularly if the first pixel and the second pixel lie on a straight line, the first and second generated straight lines may be identical.

Step b) or c) may be repeated for any pixel of the detected edge or of the selected subset of the detected edge wherein for each pixel a straight line is generated which passes through this specific pixel. Thus, for each edge pixel, a straight line may be generated which passes through the pixel, wherein the pixel votes for the generated straight line.

According to an embodiment, at least two intersections with a boundary of the digital image are determined for each generated straight line. The boundary of the digital image may be defined as the mathematical boundary having zero thickness or as the plurality of pixels forming the boundary of the digital image. The digital image may have the shape of any two-dimensional object in the Euclidian plane. It may, in particular, be a convex set of pixels within the mathematical meaning. In this case, the boundary of the digital image is a continuous curve, and any straight line which passes through a pixel of the digital image forms either exactly two intersections with the boundary of the digital image, if the pixel is an internal pixel, or at least one intersection with the boundary of the digital image, if the pixel is a boundary pixel. A special situation may be given, if a section of the boundary of the digital image is straight, i.e., has zero curvature, and is part of a generated straight line. In that case, each point or pixel of the boundary, which is also part of the generated straight line, is defined as an intersection with the boundary of the digital image within the context of an embodiment. Such a situation may particularly occur when the digital image has a rectangular shape, as is common in digital image capturing and/or processing. In the case that the first pixel and/or the second pixel is a corner pixel of the boundary of the digital image, an embodiment may further include discarding those generated straight lines, which do not form at least two intersections with the boundary of the digital image.

The digital image may also be a non-convex set of pixels, i.e., having a non-convex boundary. In this case, an embodiment may further include a convexification of the image, which is determining the smallest convex set containing the image, prior to carrying out the steps for detecting a straight line in the image, and the described steps may be carried out with the boundary of the determined smallest convex set in the same way.

For each generated straight line, a set of two parameter values is determined based on the respective determined at least two intersections, wherein the set of two parameter values uniquely determines the respective generated straight line. A parameter here and in the following denotes a quantity, like, for instance, a row index or a column index of a pixel, or Cartesian coordinates x and y, while a parameter value denotes the actual specific value of the quantity, like, for instance, the Cartesian coordinates of a specific pixel. One of the particular properties of straight lines is that each straight line can be uniquely determined by a set of two parameter values, like for instance, the intersect and slope values (see also discussion above). Within the context of an embodiment, each generated straight line is uniquely determined by specifying a set of two parameter values based on the respective determined at least two intersections. In particular, there may be a single choice of two parameters, whose parameter values are determined for each generated straight line. In particular, these two parameters may be identical. These two parameters may further define a two-dimensional parameter space, in which each set of two parameter values, which has been determined for the corresponding generated straight line based on the respective determined at least two intersections, represents a data point. Hence, repeating steps d) and e) of the above-described embodiment yields a set of two parameter values for each corresponding generated straight line.

Based on the determined sets of two parameter values, the straight line is finally detected in the digital image. In order to improve the signal-to-noise ratio of the detection method, steps b) to e) of the above-described embodiment may be carried out repeatedly for all pixels of the detected edge or at least for a subset of the pixels of the detected edge. In particular, the embodiment may include checking whether the detected edge includes a minimum number, for example more than 10, or more than 50 pixels, before carrying out any of the steps b) to f). The predetermined minimum number of pixels may particularly depend on the noise level of the digital image and/or the employed edge-detection method.

In an embodiment, the first straight line may be generated so that it is substantially orthogonal to a local gradient of an image function, in particular, of an image intensity, at the location of the first pixel, and the second straight line may be generated so that it is substantially orthogonal to a local gradient of the image function at the location of the second pixel.

The image function may be any function of one or several channels of the digital image, e.g., one or several color values and/or a luminance value and/or an alpha channel. The image function may, in particular, be an image intensity, e.g., derived from the luminance of the image, or an intensity of one or several colors. Since the digital image is composed of discrete pixel values, the image function naturally also is a discrete function. Therefore, any differentiation of the image function is a discrete differentiation which computes an approximation of the change of the image function along a predetermined direction, e.g., along the horizontal, vertical, or diagonal directions. Since the image function for a digital image is a two-variable function, a local gradient of the image function at the location of a pixel generally has two components, i.e., can be represented as a two-dimensional vector. In the simplest case, one of the components may be chosen along the horizontal direction, for instance the x-direction, and the other of the components may be chosen along the vertical direction, for instance the y-direction in a two-dimensional Cartesian coordinate system.

At each image pixel, the local gradient vector points in the direction of the largest increase of the image function. The local gradient for each image pixel may be calculated by convolving the discrete image function with a filter, i.e., an operator, in the horizontal and vertical directions, or in the diagonal direction (see below). The operator may in particular be small in terms of the number of elements compared to the number of pixels in the digital image. It may further be separable and integer valued for faster computation. If an image pixel is an edge pixel of a detected edge, wherein the detected edge represents a strong change in the image function, e.g., a strong change in the image intensity, then the local gradient of the image function for the image pixel is approximately orthogonal to the detected edge at the location of the image pixel. That is, for an extended detected edge, like a line, whether straight, curved, and/or interrupted, the local gradient vector of the image function substantially points in the direction of the local normal to the detected edge at the respective image pixel. Due to the discrete nature of the differentiations involved in the calculation of the local gradient, the local gradient generally only substantially points in the direction of the local normal. Also, noise-related edge pixels will generally result in local gradient vectors, which may deviate significantly from the local normal of the detected edge.

According to an embodiment, the first and second straight lines may be generated to be substantially orthogonal to the respective local gradient of a predetermined image function. In that case, the generated straight lines may be interpreted as local tangents to an (extended) detected edge through the corresponding image pixel. In the case of a smooth and straight detected edge, the generated straight lines will generally be substantially parallel to the detected edge and largely coincide with one another. In such a case, the accumulation step described further below will accumulate sets of two parameters at a point in the two-dimensional parameter space which corresponds to a straight line representing the detected edge.

In a further embodiment, the local gradient of the image function, in particular of the image intensity, may be calculated using a Sobel operator, a Prewitt operator, a Roberts Cross operator, or a Scharr operator. These operators are well-known operators used for edge detection in the art of image processing. All of them allow for the calculation of two directional discrete derivatives of the image function by convolving the discrete image function with one kernel for each derivative. Various kernels may be used in a conventional manner, wherein a smoothing or averaging step may be applied in addition to the calculation of the discrete derivative. Application of one of the above-listed operators generally produces a two-component gradient vector whose magnitude and direction can be calculated via simple calculus from its two components. In an additional step, the gradient vectors may be normalized with respect to a predetermined constant, e.g., when carrying out an edge-detection based on the relative magnitudes of the gradient vectors, or to 1, e.g., when generating the above-mentioned straight lines.

The convolution of the image function with one of the listed operators may be carried out only once, namely as part of the edge-detection step, and the results may be stored for reuse when generating straight lines through edge pixels according to an embodiment. Embodiments, however, are not limited to the above-listed operators but may employ any conventional method for calculating local gradients of an image function.

In a further embodiment, the step of detecting the straight line may further include:

quantizing a two-dimensional parameter space, defined by the determined sets of two parameter values, according to a predetermined quantization map;

generating an accumulation space by accumulating the determined sets of two parameter values in the quantized two-dimensional parameter space; and detecting the straight line based on a distribution of the determined sets of two parameter values in the accumulation space.

As discussed above, the two parameters at the basis of the sets of two parameter values may define a two-dimensional parameter space. In particular, the two-dimensional parameter space may be defined by the determined sets of two parameter values, i.e., the two-dimensional parameter space may be bounded in the direction of the first of the two parameters by a minimum and a maximum value of the first parameter values of the determined sets of two parameter values, and along the second parameter by a minimum and a maximum value of the second parameter values of the determined sets of two parameter values. Alternatively, the two-dimensional parameter space may be bounded by predetermined minimum and maximum parameter values, which may be determined based on properties of the digital image, in particular, a size of the digital image. In particular, the two-dimensional parameter space may be chosen large enough to cover all possible sets of two parameter values for all possible straight lines passing through the digital image. Alternatively, the two-dimensional parameter space may be a subspace of this maximal two-dimensional parameter space, covering only a certain subset of all possible straight lines passing through the digital image. As an example, only sets of two parameter values representing mainly horizontal straight lines may be considered when trying to detect a horizon. The corresponding two-dimensional parameter space may then be restricted to a significantly smaller subspace of the maximal two-dimensional parameter space.

The two-dimensional parameter space is quantized, i.e., discretized, according to a predetermined quantization map. Such a quantization map may, for instance, be given by a predetermined set of discrete parameter values for each of the two parameters. In particular, the two-dimensional parameter space may be a Cartesian parameter space, wherein the predetermined sets of discrete parameter values define a regular grid. Each of the grid cells, whose four corners are defined by grid nodes, may be regarded as a bin of the quantized two-dimensional parameter space. Alternatively, the grid nodes themselves may be regarded as bins of the quantized two-dimensional parameter space. Particularly, the two parameters defining the two-dimensional parameter space may be quantized, i.e., discretized, before the step of determining a set of two parameter values for each generated straight line based on the respective determined at least two intersections. In particular, each parameter may be discretized by a corresponding predetermined set of discrete parameter values, and determining a set of two parameter values for each generated line may be carried out by determining a set of two discrete parameter values so that the determined set of two parameter values lies within predetermined intervals around the determined set of two discrete parameter values. In this case, the quantized two-dimensional parameter space may be defined by the grid nodes of the regular grid, which is defined by the corresponding two discretized parameters.

The set of two parameter values determined for a generated straight line which passes through a pixel of the digital image may be called a vote of the corresponding pixel. According to an embodiment, the votes of the first pixel and the second pixel of the detected edge are accumulated in the quantized two-dimensional parameter space by accumulating the determined sets of parameter values in the quantized two-dimensional parameter space. In particular, for each bin of the quantized two-dimensional parameter space, it may be counted how many of the determined sets of two parameter values fall within the respective bin. Depending on the resolution of the quantized two-dimensional parameter space, with respect to the two parameters, determined sets of two parameter values for nearly collinear straight lines will likely lie within the same bin of the quantized two-dimensional parameter space. Thus, accumulating the determined sets of two parameter values in the quantized two-dimensional parameter space may lead to a histogram over the quantized two-dimensional parameter space, representing the distribution of the determined sets of two parameter values in the quantized two-dimensional parameter space. The more of the determined sets of two parameter values fall within the same bin in the quantized two-dimensional parameter space, the more likely the corresponding pixels, through which the generated straight lines corresponding to the determined sets of two parameter values pass, lie on a straight line, i.e., are collinear. By accumulating the determined sets of two parameter values in the quantized two-dimensional parameter space, an accumulation space is generated, which is defined by the quantized two-dimensional parameter space or a subspace of the quantized two-dimensional parameter space.

Finally, the straight line is detected according to an embodiment based on a distribution or histogram of the determined sets of two parameter values in the accumulation space. The distribution of the determined sets of two parameter values in the accumulation space may be normalized by a predetermined value, e.g., the overall number of determined sets of two parameter values or the overall number of pixels, for which a straight line which passes through the corresponding pixel has been generated.

In a further embodiment, quantizing the parameter space according to the predetermined quantization map may include dividing the boundary of the digital image into a plurality of segments and assigning a unique index to each segment of the plurality of segments;

determining the at least two intersections for each generated straight line may include determining the unique indices of those segments of the plurality of segments, which include an intersection; and determining the set of two parameter values for each generated straight line may include selecting two unique indices out of the determined unique indices for the respective straight line.

The plurality of segments into which the boundary of the digital image is divided may be based on the plurality of pixels of the digital image which are part of the boundary. In particular, each segment of the plurality of segments may be defined by a predetermined number of consecutive boundary pixels. The unique index assigned to each segment of the plurality of segments may be a numerical index, an alpha-numerical index, or an arbitrary index. For example, the unique indices assigned to the segments of the plurality of segments may be chosen such that they may be ordered in a selected order.

After having divided the boundary of the digital image into the plurality of segments and having assigned a unique index to each segment of the plurality of segments, each of the determined at least two intersections for each generated straight line may be assigned a unique index by determining which segment of the plurality of segments includes the corresponding intersection, for instance as an intersection point or an intersection pixel of the boundary. Thus, at least two unique indices may be determined for each generated straight line corresponding to the respective at least two intersections of the respective generated straight line with the boundary. Finally, the set of two parameter values of each generated straight line may be determined, as already described above, by selecting two unique indices out of the determined unique indices for the respective straight line. In particular, as described above, in those cases, where more than two intersections have been determined for a generated straight line, e.g., if the generated straight line coincides with a straight part of the boundary, the selected two unique indices may correspond to those two intersections out of the at least two intersections, which have the greatest distance from each other. The two parameter values of the set of two parameter values may then be given by the selected two unique indices.

Dividing the boundary of the digital image in to a plurality of segments and assigning a unique index to each segment of the plurality of segments and subsequently determining the set of two parameter values for each generated straight line by determining the corresponding set of two unique indices for the corresponding determined at least two intersections allows for a simple way of representing each generated straight line by the two unique indices of the two boundary segments which correspond to the two intersections of the generated straight line with the boundary. The corresponding quantized two-dimensional parameter space may be called boundary intersection space, and replaces the polar space of the Hough transform. Due to the finite length of the boundary of the digital image and correspondingly the finite size of the set of segments forming the boundary, the quantized two-dimensional parameter space is naturally bounded in both dimensions. In particular, according to the above-described quantization of the parameter space, the two parameters defining the parameter space may be defined by the set of unique indices of the segments of the plurality of segments, and may be, in particular, identical.

In an embodiment, the unique indices may be determined by numbering the segments of the plurality of segments starting from a determined segment in a clockwise or anti-clockwise way. The predetermined segment may, in particular, be a corner segment of the boundary of the digital image. The numbering may be done by assigning natural numbers with a step size of one or larger.

In a further embodiment, the segments of the plurality of segments may have equal length. The length may be measured in physical length units, like millimeters, or in the number of pixels. The latter option may particularly be relevant with respect to non-square pixel dimensions.

In an embodiment, the digital image may have a rectangular shape and a width of w pixels and a height of h pixels. In fact, such a rectangular shape represents the most common case in digital image processing. The length of the segments of the plurality of segments may further be determined with respect to the resolution of the digital image, i.e., with respect to the width and the height of the digital image. For digital images with a large number w of pixels in a horizontal direction and/or a large number h of pixels in a vertical direction, the length of the segments of the plurality of segments in terms of the number of pixels in each segment, may be increased with respect to digital images of a lower resolution, i.e. smaller numbers w and h of pixels.

In an embodiment, the rectangular digital image may include a longer side and a shorter side with respect to each other and the segments of the boundary along the longer side may have a greater length than segments of the boundary along the shorter side.

In an embodiment, determining the set of two parameter values for each generated straight line may further include ordering the two parameter values of the respective set of two parameter values in a numerically increasing or decreasing order; and detecting the straight line may be carried out based on the distribution of the ordered sets of two parameter values in a sub-space of the accumulation space, wherein each point of the sub-space is defined by a set of a first parameter value and a second parameter value, and wherein the first parameter value and the second parameter value fulfill the same ordering as the two parameter values of the sets of two parameter values. As described above, a pair of indices (i, j) uniquely determines a generated straight line based on the boundary segments, which the generated straight line intersects. Apparently, pairs (i, j) and (j, i) represent the same straight line, such that a standard representation of a set of two parameter values, i.e., a set of two corresponding indices, may be chosen by numerically (or alphanumerically) ordering the two parameter values, i.e., the two unique indices. Thus, by ordering the two parameter values in a numerically increasing or decreasing order, the quantized two-dimensional parameter space which needs to be considered when accumulating the determined sets of two parameter values may be reduced by half, namely to a sub-space, wherein each point of the sub-space is defined by a set of a first parameter value and a second parameter value, and wherein the first parameter value and the second parameter value fulfill the same ordering as the two parameter values of the sets of two parameter values. Thus, each point of the sub-space has coordinates (i, j) which fulfill the same numerical ordering, which has been set as the standard ordering for the sets of two parameter values.

In a further embodiment, detecting the straight line based on the distribution of the determined sets of two parameter values in the accumulation space may include determining a local maximum of the distribution or a point at which the value of the distribution is above a predetermined threshold. If a detected edge is part of a straight line existing in a digital image, many of the pixels of the detected edge will lie on the straight line. Therefore, the distribution of the determined sets of two parameter values in the accumulation space typically will have a local peak at the point in the accumulation space corresponding to the straight line in the digital image. By searching for local maxima in the accumulation space, the most probable straight lines in the digital image can be extracted. According to an embodiment, the determined local maximum of the distribution may correspond to the global maximum of the distribution, or may represent a local maximum out of the set of local maxima of the distribution overall. In particular, a plurality of straight lines may be detected by determining more than one local maximum of the distribution. Alternatively, a predetermined threshold may be set and those points of the accumulation space, whose values of the distribution are above the predetermined threshold, may be determined. The latter method may allow determining a cluster of points representing the straight line to be detected such that a mean and a variance of the straight lines corresponding to the cluster of points may be determined.

In a further embodiment, generating the first straight line and determining at least two intersections with the boundary of the digital image for the first straight line, and generating the second straight line and determining at least two intersections with the boundary of the digital image for the second straight line, each may include:

calculating a slope of the corresponding straight line based on the components of the corresponding local gradient of the image function, in particular of the image intensity; and determining the corresponding at least two intersections with the boundary based on the slope of the corresponding straight line and the location of the corresponding pixel, which the corresponding straight line passes through.

As described above, the two components of a local gradient vector may be calculated by convolution of the image function with one of the above listed operators. Assuming that $\Delta x$ and $\Delta y$ denote the two components of the local gradient vector, the slope m of the generated straight line which is substantially orthogonal to the local gradient vector may simply be determined by setting $m=-\Delta x/\Delta y$. From the slope and the location of the image pixel, which the generated straight line passes through, it is straightforward to determine the at least two intersections with the boundary in a conventional manner. Here, it is noteworthy, that determining an intersection based on the slope and the coordinates of the image pixel does not involve any evaluation of trigonometric functions, but merely multiplications, divisions, and sums, and can, therefore, be carried out at a much lower computational cost than at least some conventional methods.

In an embodiment, a method may further comprise:

pre-processing the digital image before detecting the edge by applying a smoothing or filtering operation; and/or applying an edge-thinning operation to the detected edge before generating the first and second straight line.

The smoothing or filtering operation may be carried out according to any conventional method, in particular using a median filter, a mean filter, or a Gaussian filter. A purpose of the smoothing or filtering operation is to remove unwanted noise from the digital image before trying to detect an edge. Once an edge has been detected, a conventional edge-thinning operation may be applied to the detected edge before generating the first and second straight lines. Applying an edge-thinning operation before generating the first and second straight lines has the advantage of removing unwanted spurious points on the detected edge which would appear as noise in the accumulation space. One of the popular conventional algorithms for edge-thinning is based on passes through the detected edge and removal of neighboring points. The better edge is detected, i.e., the fewer noise or spurious points are included in the set of pixels constituting the detected edge, the more efficient a subsequent Hough transform for detecting a straight line will be.

According to a further embodiment, a method may be repeatedly carried out for a plurality of detected edges in the digital image and a plurality of straight lines may be detected based on the determined sets of two parameter values, wherein the method may further include:

detecting at least two vanishing lines out of the plurality of detected straight lines; and detecting at least one vanishing point based on the detected at least two vanishing lines.

In a first step, a plurality of edges may be detected in the digital image. The method may then be carried out for each of the detected edges and the determined sets of two parameter values may be accumulated in the accumulation space for all of the detected edges. In particular, the two-dimensional parameter space and the accumulation space may be the same for all of the detected edges. Based on detecting a plurality of local maxima or a plurality of points above a predetermined threshold in the distribution of the determined sets of two parameter values in the accumulation space, a plurality of straight lines may then be detected, which may further be processed. Alternatively, only one straight line may be detected based on a global maximum or a single point above a predetermined threshold. In this case, multiple detected edges may contribute to the detected straight line, especially if they represent segments of an interrupted edge in the digital image. In the case that a plurality of straight lines has been detected, at least two vanishing lines may be selected based on the criterion that they intersect at one point. The intersection point herein may lie inside the digital image or outside the digital image. The step of detecting at least two vanishing lines may further include detecting at least two dominant vanishing lines, wherein a dominant straight line may be defined as corresponding to a point in the accumulation space, whose value of the distribution is above a pre-defined minimum value. For each pair of vanishing lines, a unique intersection point may be determined and marked in an intersection space, which may be defined as the image space extended by predefined margins. Similar to the previously described accumulation in the accumulation space, the intersection points of the pairs of vanishing lines may be accumulated in the intersection space, and at least one vanishing point may be determined based on the distribution of intersection points in the intersection space. Here, a true vanishing point is acquired from at least two vanishing lines. If the intersection points are not all located at the same point in the intersection space, a vanishing region may be determined rather than a vanishing point. Here, a vanishing region may be defined by a value of the distribution of intersection points in the intersection space above a predetermined threshold. From a determined vanishing region, a vanishing point may then be detected, e.g., based on a center-of-mass calculation. Thus, at least one vanishing point may be detected based on the detected at least two vanishing lines. From the plurality of straight lines, those straight lines which pass through a vanishing point or a vanishing region may be re-labeled as vanishing lines.

Based on the detected at least two vanishing lines and the detected at least one vanishing point, a depth map may further be constructed for the digital image, which may be used for a conversion of the digital image from two dimensions to three dimensions. The depth map here assigns a relative depth to each pixel of the digital image by determining the distance of the surfaces of objects from a view point based on the detected at least one vanishing point. Depth maps can also be used to selectively blur an image to varying degrees. Any conventional method known in the art for determining a depth map from determined vanishing lines and/or determined vanishing points may be used. Due to its minimal memory requirement and low computational complexity, an embodiment for detecting a straight line in a digital image largely simplifies and speeds up automatic 2D to 3D image/video conversion algorithms. By implementing an embodiment, an automatic 2D to 3D conversion may be implemented on an image-capturing device.

Furthermore, a computer program product may include one or more computer readable media having computer executable instructions for performing the steps of any of the above described embodiments.

Finally, an image-capturing device including a processing unit may be provided, wherein an embodiment is implemented. The image-capturing device may, in particular, be a digital camera, a camera-equipped cell phone or smart phone or a digital video camera. The processing unit may, in particular, be a central processing unit (CPU) or a graphics processing unit (GPU).

Other applications of an embodiment include the following:

Vanishing-point detection for 3D reconstruction (structure from motion to detect parallelism and perpendicularity information) and Augmented Reality applications as well as targeted advertisement (for example targeted advertisement can be superimposed within the real video content: in this case the graphics or the advertisement is placed in a particular bounding box where perspective and depth position should be taken care of).

Lane detection for driving safety: vanishing-point detection could enable the possibility to understand the relative position of a car within its lane, preventing lane crossing or alerting the driver about the curvature of the road ahead if it is, for example, too sharp for the car speed. Applications in autonomous cars are also contemplated.

Camera calibration: information from the detection of the vanishing line can improve the reliability of the camera calibration, allowing a better estimation of the camera parameters.

Scene segmentation and sky detection: vanishing-line and point detection allow for an easier identification of the horizon line in a video sequence, in order to better identify the sky regions in the scene, allowing a better stabilization and eventually rectification of the images The described embodiments of a method and device allow for a simple and effective way of detecting a straight line in a digital image. By using a boundary intersection space based on the intersections of generated straight lines with the boundary of the digital image, a naturally bounded two-dimensional parameter space can be defined. By dividing the boundary of the digital image into a plurality of segments, which may be numbered, a natural quantization of the boundary intersection space can be achieved. An embodiment explicitly avoids the use of computationally expensive trigonometric functions, which are abundantly used in Hough transforms. Furthermore, only a single straight line may be generated for each pixel of a detected edge instead of the large number of straight lines that are typically generated by conventional techniques. Also, a convolution of an image function with a first derivative operator carried out as part of the edge-detection step may be recycled for the generation of the straight lines. Therefore, the resulting algorithm is significantly more effective and computationally much less expensive than at least some conventional detection methods. It furthermore has a lower memory requirement than at least some conventional methods. Its low memory requirement and simplicity make an embodiment an ideal candidate for implementation in mobile image-capturing devices with limited computer resources, such as digital cameras or mobile phones.

The simplicity of an embodiment, further presents opportunities for optimization. As a first aspect, a resolution of the two-dimensional parameter space may easily be changed, e.g., refined, by re-partitioning the plurality of segments constituting the boundary of the digital image. Such a refinement may be carried out in a global sense, by decreasing the size of each segment, or locally, where needed, by locally dividing a specific segment into a plurality of segments. When dividing a segment into three parts instead of two parts, most of the distribution in the accumulation space may be recycled.

BRIEF DESCRIPTION OF THE DRAWINGS

Features and exemplary embodiments, as well as advantages thereof, will be explained in detail with respect to the drawings. It is understood that the concepts described herein should not be construed as being limited by the description of the following embodiments. It should furthermore be understood that some or all of the features described in the following may also be combined in alternative ways.

DETAILED DESCRIPTION

Figure 1:
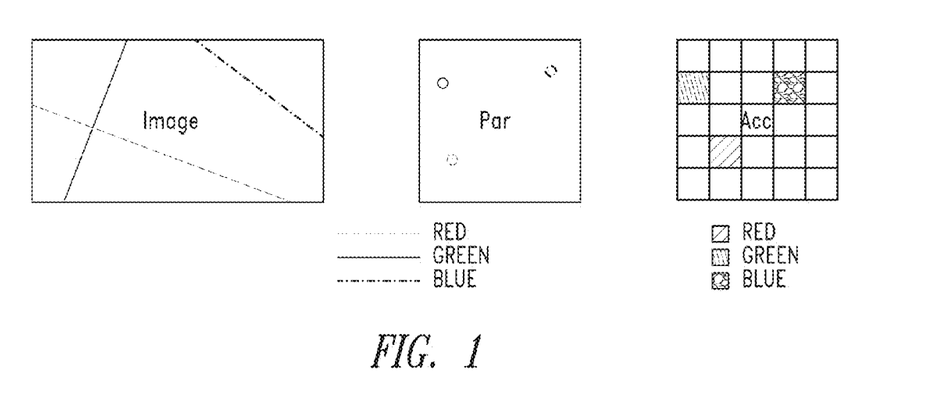
FIG. 1 shows three lines in an image represented as points in the two-dimensional parameter space Par and in the discrete accumulation space Acc, according to an embodiment.

FIG. 1 demonstrates the representation of three exemplary straight lines in a digital image by points in a two-dimensional parameter space Par and further by points in a discretized accumulation space Acc, according to an embodiment. Here, the two-dimensional parameter space has been discretized by generating an equidistant grid which constitutes a finite number of bins. The accumulation step then includes determining in which bin each of the points in the two-dimensional parameter space falls. Each of the points in the two-dimensional parameter space represents a set of two parameter values which uniquely determine the respective straight line in the image. Different shades of gray here show the correspondence between a bin in the accumulation space and a point in the two-dimensional parameter space.

Figure 2:
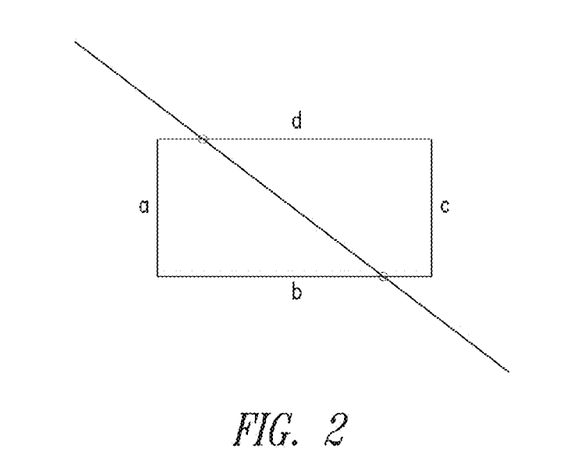
FIG. 2 shows a straight line passing through the image, intersecting the sides of the image in two points, according to an embodiment.

FIG. 2 shows a straight line passing through the digital image intersecting the sides of the image in two points, according to an embodiment. Here, the boundary of the digital image is shown as a line in the mathematical sense, consisting of the four sides a, b, c, and d of the rectangular digital image. If the origin of a Cartesian coordinate system is located at a specific point of the digital image, e.g., the upper left corner of the digital image, the two intersection points may be represented by pairs of coordinates in the corresponding coordinate system. Thus, the two-dimensional parameter space may be defined based on the two-dimensional Cartesian coordinate system by calculating two parameter values for the straight line from the pairs of coordinates of the two intersection points. Possible candidates for such a calculation are the distance of each intersection point from a predetermined point of the two-dimensional Cartesian coordinate system, particularly the distance of each intersection point from a predetermined point of the boundary along the boundary in a clockwise or counter-clockwise direction.

Figure 3:
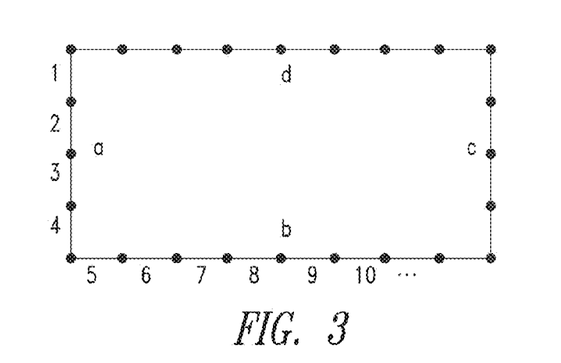
FIG. 3 shows the boundary of the image divided into segments with the same length labeled with an increasing index, according to an embodiment.

FIG. 3 demonstrates the quantization of the two-dimensional parameter space by dividing the boundary of the digital image into segments, which, in this example, have the same length and are labeled with an increasing index, according to an embodiment. In this particular embodiment, the segments of the boundary are numbered starting from the upper-left corner of the digital image in a counter-clockwise direction. The quantization map thus maps the two-dimensional parameter space onto a quantized two-dimensional space, whose two dimensions are given by the indices of the boundary segments. The two-dimensional parameter space may be given by determining the distance of the two intersection points along the perimeter of the digital image from a predetermined point on the boundary, e.g., the upper-left corner. Again, the two-dimensional parameter space is discretized by dividing the boundary into segments of finite lengths, i.e., quantizing the distance along the perimeter of the digital image from the predetermined point on the boundary. Then, it may be determined which segment of the boundary includes an intersection point, thus, determining pairs of indices corresponding to the intersected segments and representing the straight line.

An embodiment of using a boundary intersection space as the accumulation space rather than the polar space can be compared to the Hough transform using the polar space according to a conventional method by randomly generating a family of straight lines and investigating their variance. This variance, in fact, may be important for evaluating the dispersion of data and, in this context, for estimating how the accumulation space is balanced: a high value of variance means that the resulting histogram is not flat and implies, since the straight lines are randomly created, that the accumulation space prefers some straight lines with respect to others. Vice versa, a small variance indicates that the histogram is flat and that the accumulation space is balanced.

For this reason, a random configuration of straight lines in a digital image has been simulated, mimicking the processes which take place in Hough transforms for a real digital image. First, n pixels are randomly chosen in the image and for every chosen pixel a straight line passing through it is created. This straight line is realized by generating a uniform value in $(-\pi/2, \pi/2)$ which represents the angle between the straight line and the x-axis of a two dimensional Cartesian coordinate system. Then, every generated pixel votes for the straight line passing through it and these votes are stored both in the polar accumulation space, AccPolar, and in the boundary intersection accumulation space AccSeg. The variances of the resulting histograms are compared for the case that the accumulation spaces have the same dimensions. It can be observed, that the difference between the two variances increases with the number of lines, but overall remains very small. These results demonstrate that the two accumulation spaces are equally balanced.

By increasing the number of segments into which the boundary of the digital image is divided, a finer resolution can be achieved. In the case that the sets (i, j) of two parameter values are ordered, the accumulation space AccSeg may be reduced to a size $n \times (n-1)/2$, where n is the number of segments. Thus, the relevant fraction of the boundary intersection accumulation space is smaller than the accumulation space for the polar representation at equal resolution. Since the variances of both accumulation spaces are comparable, an embodiment can provide a significantly improved performance in terms of efficiency without loss of precision.

Figure 4:
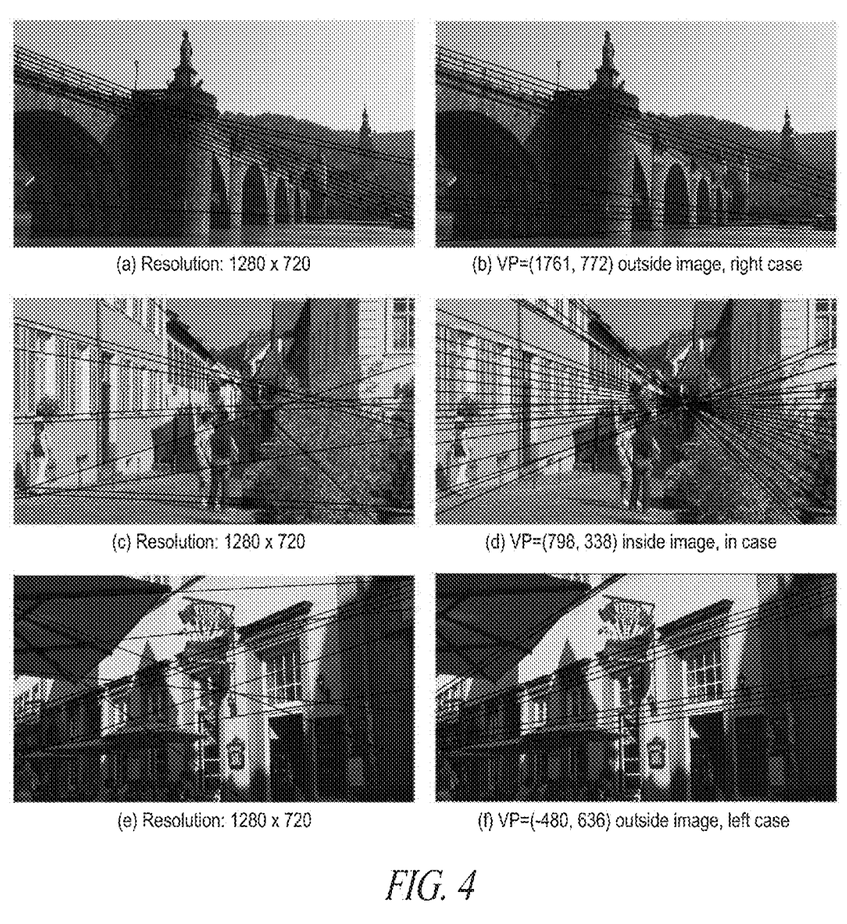
FIG. 4 shows examples for the detection of a vanishing point based on detected straight lines, according to an embodiment.

FIG. 4 shows various examples for the detection of a vanishing point according to an embodiment. In the left column, three exemplary digital images are shown together with a multiplicity of straight lines, which have been detected by applying an embodiment. It can be seen that each detected straight line corresponds to a detected edge. By determining the intersection points of each pair of detected straight lines and accumulating them in an intersection space, one or several vanishing points may be detected. In the given examples, a vanishing point may be detected outside the image on the right-hand side, as in sub-figure (b), in the center of the image as in sub-figure (d), or outside the image on the left-hand side as in sub-figure (f). Generally, the point with the maximum number of votes of the intersection points may be selected as the vanishing point. Vanishing lines are then lines which pass through the vanishing point.

Any of the above-described method embodiments may be performed by a computing circuit, which may include a microprocessor, a microcontroller, or a non-instruction-executing circuit such as a field-programmable gate array (FPGA) or an application-specific integrated circuit (ASIC). Furthermore, such circuitry may be combined with another circuit, such as a pixel array or a display, to form a system such as a tablet computer or a smart phone. Moreover, the computing circuit and the other circuit may be disposed on a same, or on respective, integrated-circuit dies.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
an edge-detector circuit configured to identify an edge within an image that includes a boundary, the edge including a plurality of pixels; and
a straight-line-detector circuit configured to identify,
a first straight line that intersects a first pixel of the identified edge with a first identifier that indicates at least two points at which the first straight line intersects the boundary,
a second straight line that intersects a second pixel of the identified edge with a second identifier that indicates at least two points at which the second straight line intersects the boundary,
an edge straight line representing the identified edge based on the first and second identifiers,
wherein the straight-line detector circuit is further configured to,
quantize a two-dimensional parameter space, defined by determined first and second identifiers, according to a predetermined quantization map, including dividing the boundary into a plurality of segments and assigning a unique index to each segment of the plurality of segments,
generate an accumulation space by accumulating the determined first and second identifiers in the quantized two-dimensional parameter space, and
detect the straight line based on a distribution of the determined first and second identifiers in the accumulation space;
determine the unique indices of those segments of the plurality of segments, which comprise an intersection, to thereby detect the at least two points of intersection for each straight line, and
select two unique indices out of the determined unique indices for each of the straight lines to determine the first and second identifiers.

2. The apparatus of claim 1 wherein the edge-detector circuit is configured to identify the edge as a region of the image in which a change in a magnitude of an image parameter exceeds a threshold.

3. The apparatus of claim 1 wherein the edge-detector circuit is configured to identify the edge as a region of the image in which a rate of change of a magnitude of an image parameter exceeds a threshold.

4. The apparatus of claim 1 wherein the edge-detector circuit is configured to identify the edge as a region of the image in which a rate of change of a magnitude of an image parameter exhibits a maxima.

5. The apparatus of claim 1 wherein the boundary is located approximately along a periphery of the image.

6. The apparatus of claim 1 wherein:
the first identifier includes a first value that represents one of the at least two points at which the first straight line intersects the boundary and includes a second value that represents another of the at least two points at which the first straight line intersects the boundary; and
the second identifier includes a third value that represents one of the at least two points at which the second straight line intersects the boundary and includes a fourth value that represents another of the at least two points at which the second straight line intersects the boundary.

7. The apparatus of claim 1 wherein the straight-line-detector circuit is configured to identify the edge straight line in response to a distribution of the first and second identifiers.

8. The apparatus of claim 1, further comprising a vanishing-point-detector circuit configured to identify a vanishing point for the image in response to the edge straight line.

9. The apparatus of claim 1, further comprising:
at least one computing circuit; and
wherein at least one of the edge-detector circuit and the straight-line-detector circuit is disposed on the computing circuit.

10. The apparatus of claim 9 wherein the computing circuit and the at least one of the edge-detector circuit and the straight-line-detector circuit that is disposed on the computing circuit and the other of the at least one of the edge-detector circuit and the straight-line-detector circuit are disposed on respective integrated-circuit dies.

11. The apparatus of claim 9 wherein the computing circuit and the at least one of the edge-detector circuit and the straight-line-detector circuit that is disposed on the computing circuit and the other of the at least one of the edge-detector circuit and the straight-line-detector circuit are disposed on a same integrated-circuit die.

12. A method, comprising:
detecting a first edge within an image that includes a boundary, the first edge including a plurality of pixels;
generating a first straight line that passes through a first pixel of the detected first edge;
generating a second straight line that passes through a second pixel of the detected first edge;
detecting at least two intersections with the boundary for each of the first and second straight lines;
determining a set of two parameter values for each of the first and second generated straight lines based on the respective determined at least two intersections; and
detecting a straight line in the image based on the determined sets of two parameter values, detecting the straight line including,
quantizing a two-dimensional parameter space, defined by the determined sets of two parameter values, according to a predetermined quantization map, the quantizing including dividing the boundary into a plurality of segments and assigning a unique index to each segment of the plurality of segments;
generating an accumulation space by accumulating the determined sets of two parameter values in the quantized two-dimensional parameter space; and
detecting the straight line based on a distribution of the determined sets of two parameter values in the accumulation space;
wherein detecting the at least two intersections for each generated straight line comprises determining the unique indices of those segments of the plurality of segments, which comprise an intersection; and
wherein determining the set of two parameter values for each generated straight line comprises selecting two unique indices out of the determined unique indices for the respective straight line.

13. The method of claim 12 wherein the first straight line is generated so the first straight line is substantially orthogonal to a local gradient of an image function at the location of the first pixel; and wherein the second straight line is generated so that the second straight line is substantially orthogonal to a local gradient of the image function at the location of the second pixel.

14. The method of claim 13 wherein the local gradient of the image function is calculated using a Sobel operator, a Prewitt operator, a Roberts Cross operator, or a Scharr operator.

15. The method of claim 14 wherein the image function indicates an intensity of the image.

16. The method of claim 12 wherein the unique indices are determined by numbering the segments of the plurality of segments starting from a predetermined segment in a clockwise or anticlockwise way.

17. The method of claim 16 wherein the segments of the plurality of segments have equal length.

18. The method of claim 17 wherein the image has a rectangular shape and a width of w pixels and a height of h pixels.

19. The method claim 18,
   wherein determining the set of two parameter values for each generated straight line further comprises ordering the two parameter values of the respective set of two parameter values in a numerically increasing or decreasing order; and
   wherein detecting the straight line is carried out based on the distribution of the ordered sets of two parameter values in a sub-space of the accumulation space, wherein each point of the sub-space is defined by a set of a first parameter value and a second parameter value, and wherein the first parameter value and the second parameter value fulfill the same ordering as the two parameter values of the sets of two parameter values.

20. The method of claim 19 wherein detecting the straight line based on the distribution of the determined sets of two parameter values in the accumulation space comprises determining a local maximum of the distribution or a point at which the value of the distribution is above a predetermined threshold.

21. The method of claim 12 wherein generating the first straight line and determining its at least two intersections with the boundary of the digital image, and generating the second straight line and determining its at least two intersections with the boundary of the digital image, each comprises:
   calculating a slope of the corresponding straight line based on the components of the corresponding local gradient of the image function, in particular of the image intensity; and
   determining the corresponding at least two intersections with the boundary based on the slope of the corresponding straight line and the location of the corresponding pixel, which the corresponding straight line passes through.

22. The method of claim 12 further comprising:
   pre-processing the image before detecting the edge by applying a smoothing or filtering operation; and/or
   applying an edge thinning operation to the detected edge before generating the first and second straight lines.

23. The method of claim 12,
   wherein the method is repeatedly carried out for a plurality of detected edges in the image and a plurality of straight lines is detected based on the determined sets of two parameter values; and
   wherein the method further includes:
      detecting at least two vanishing lines out of the plurality of detected straight lines; and
      detecting at least one vanishing point based on the detected at least two vanishing lines.

\* \* \* \* \*